Aug. 8, 1950  C. N. SMYTH ET AL  2,517,605
ELECTRIC WAVE METER
Filed Aug. 18, 1945  3 Sheets-Sheet 1
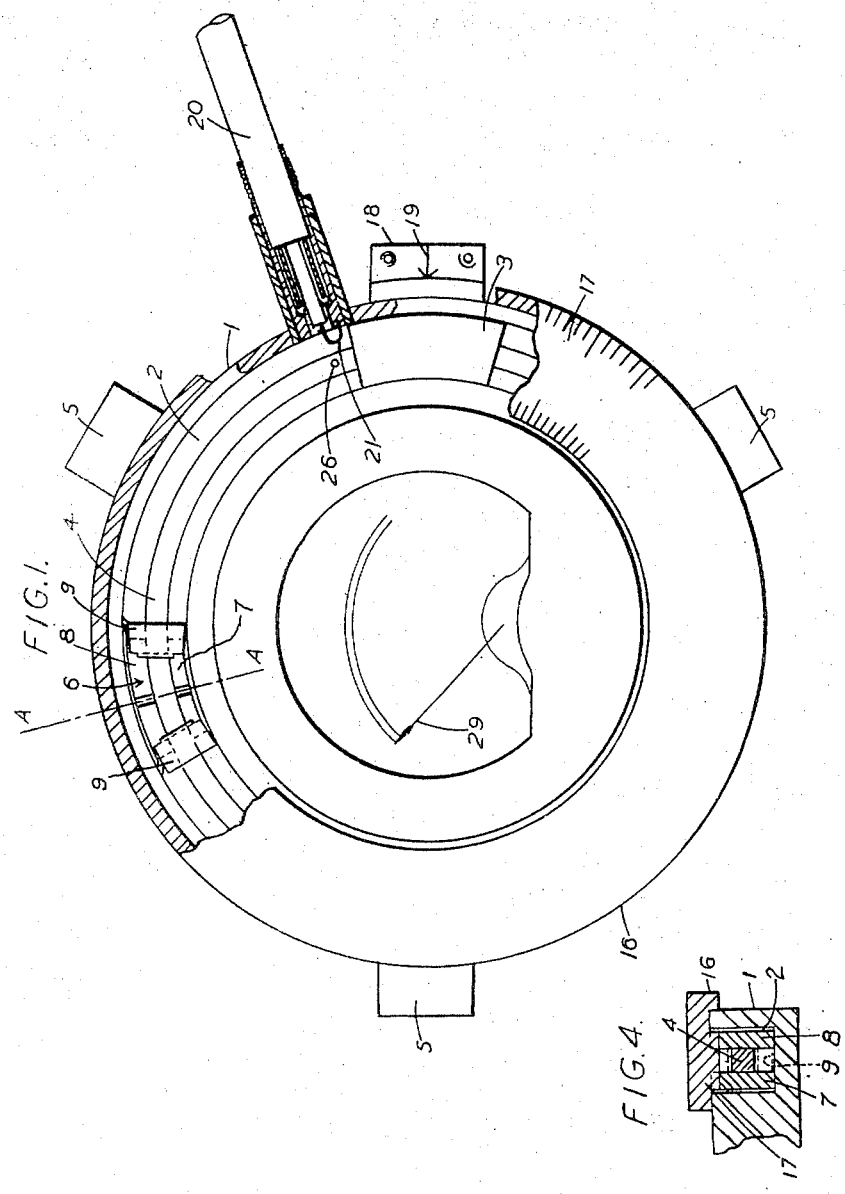
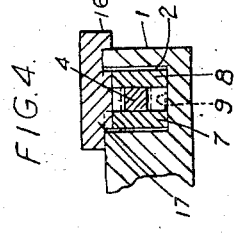
Inventor
CHARLES NORMAN SMYTH
ARCHIBALD STEPHENS WADE
by
Attorney

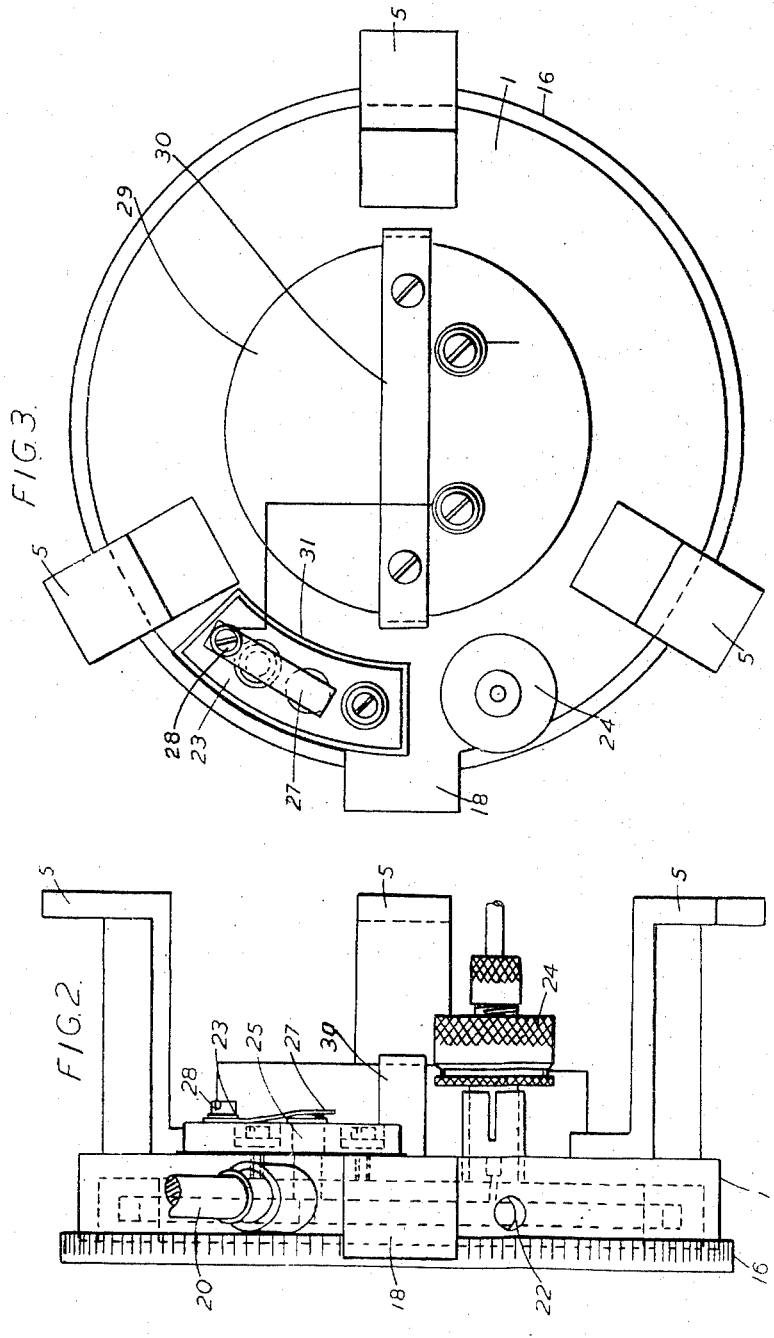

Aug. 8, 1950   C. N. SMYTH ET AL   2,517,605
ELECTRIC WAVE METER
Filed Aug. 18, 1945   3 Sheets-Sheet 3
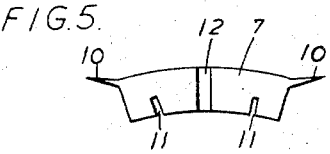
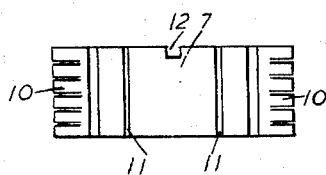
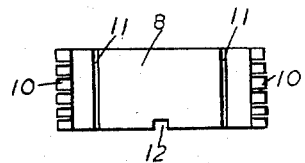
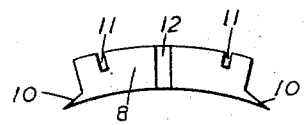
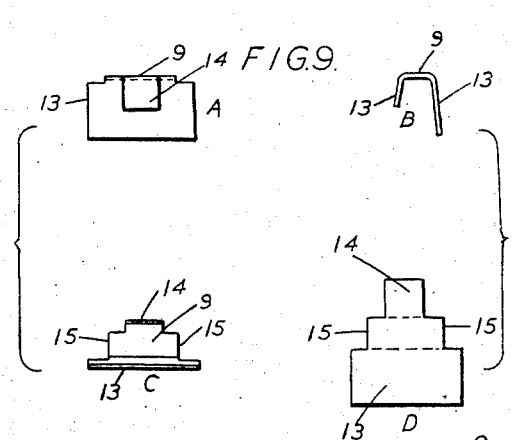
Inventor
CHARLES. NORMAN SMYTH.
ARCHIBALD. STEPHENS. WADE.
by
Attorney Patented Aug. 8, 1950

2,517,605

UNITED STATES PATENT OFFICE 2,517,605

ELECTRIC WAVEMETER

Charles Norman Smyth and Archibald Stephens Wade, London, England, assignors, by mesne assignments, to International Standard Electric Corporation, New York, N. Y., a corporation of Delaware Application August 18, 1945, Serial No. 611,414
In Great Britain May 10, 1945

11 Claims. (Cl. 250—39)

The present invention relates to electric wave meters.

The object of the present invention is to provide a neat, compact and accurate wave meter, particularly for wavelengths from a few centimetres upwards, which shall be easy to manufacture and not likely to get out of order.

The invention accordingly provides an electric wave meter comprising a hollow resonator provided with means controlled by the rotation of a cover which closes the said resonator for adjusting the resonance frequency thereof, means for introducing waves to be measured into the resonator, and means for detecting the resonance of the waves in the resonator.

The invention will be described with reference to the accompanying drawings in which:

Fig. 1 shows a top view of an embodiment of the invention, partly broken away to show the interior details, Fig. 2 shows a side view of the embodiment;

Fig. 3 shows an underside view of the embodiment;

Fig. 4 shows a partial sectional view at A—A of Fig. 1;

Figs. 5 and 6 show respectively a top view and a view looking at the concave face of a block forming one part of the sliding piston;

Figs. 7 and 8 show respectively a top view and a view looking at the convex face of a block forming another part of the piston; and Fig. 9 shows at A, B and C respectively a front elevation, side elevation and top view of another portion of the piston, and at D the shape of the sheet from which it is constructed.

The wave meter shown in Figs. 1 to 4 comprises an annular brass casting 1 of rectangular section having cut therein a channel 2 also of rectangular section. A block 3 consisting of two similar channel-shaped half-portions is sweated at one point inside the channel. This block holds in position a brass bar conductor 4 of square section formed into a ring co-axial with the channel 2 and centrally located therein. This conductor 4 forms with the channel 2 a co-axial conductor resonator. The casting 1 is supported by three metal legs 5 suitably fixed thereto.

Sliding on the conductor 4 is a composite piston 6 shaped to conform with the curve of the channel 2. This piston is made up of two brass or Phosphor bronze blocks 7 and 8 shown in detail in Figs. 5 and 6, and 7 and 8, respectively, and four of the Phosphor bronze springs 9 shown in Fig. 9.

The block 7 (Figs. 5 and 6) is of rectangular section and is bent into a circular arc to fit between the conductor 4 and the outer wall of the channel 2. The breadth (seen in Fig. 6) is equal to the depth of the channel 2. The edges of the block on the convex side are drawn out into a series of thin fingers 10 which are sprung slightly outwards as indicated in Fig. 5. Two narrow slots 11 are cut transversely across the convex face, the depth of the slots being perhaps one third of the thickness of the block. These slots are cut parallel to the radial ends of the block, and are therefore not themselves radial. A shallow somewhat wider radial slot 12 is cut centrally in the top face of the block.

The block 8 shown in Figs. 7 and 8 is similar to the block 7 except that it is curved in the opposite direction in order to fit between the conductor 4 and the inner wall of the channel 2. It has the same features (which are similarly designated), the only difference being that the fingers 10 are on the concave side and the slots 11 are on the convex side. Corresponding pairs of the slots 11 in the two blocks are cut so as to be opposite to one another across the blocks, when assembled in the resonator.

The spring 9 shown in Fig. 9 is formed from a thin sheet of Phosphor bronze cut to the shape shown at D, by bending it about the dotted lines shown in the sketch D in the manner indicated in the sketch B.

The composite piston 6 is made up in the following manner. Two of the springs 9 are placed with the portions 13 pointing in opposite directions in contact with the floor of the channel 2 and the tongues 14 under the central conductor 4. This is, of course, done before the central conductor 4 is finally fixed by means of the block 3 inside the channel 2. The two blocks 7 and 8 are then placed in position with the slots 11 engaging the shoulders 15 of the springs 9. Then the remaining two springs 9 are placed in similar fashion on top, with the shoulders 15 in the slots 11 and with the tongues 14 in contact with the upper side of the conductor 4.

An annular brass cover 16 closes the channel 2 thus completing the resonator. This cover has a slight ridge projecting downwards on the outer edge for keeping it in place on the casting 1. The cover also has a radial fillet 17 (see Fig. 4) at one point on the underside, which fillet engages the slots 12 in the blocks 7 and 8. Thus it will be seen that by coaxially rotating the cover 16, the composite piston 6 (which runs on the central conductor 4) may be moved completely round the resonator. It will be understood that the portions 13 of the springs 9 are sprung outwards and press upon the floor of the channel 2 and upon the underside of the cover 16; while the fingers 10 of the blocks 7 and 8 press upon the sides of the channel, thus efficiently short circuiting the resonator. The form of the blocks 7 and 8 and of the springs 9 is also such as substantially to close the end of the resonator.

It will be observed that the arrangement provides in effect two separate resonators the lengths of which are adjusted simultaneously in opposite directions by rotation of the cover 16. These two resonators are respectively terminated by opposite ends of the block 3 and by opposite ends of the piston 6.

The upper surface of the cover 16 may be provided with graduations such as 17 marked in wavelengths, for example, and a block 18 may be fixed at a point on the outside of the casting 1 bearing an index mark 19.

A co-axial transmission line 20 is provided for introducing the waves to be measured into one of the resonators. The central conductor of this line terminates in a loop 21 linking the field inside the resonator. A second transmission line (not shown) may be similarly fixed through a hole 22 (seen in Fig. 2) in order to introduce waves into the other resonator.

Resonance in either of the resonators is detected by means of a suitable crystal unit, two different types of which are shown at 23 and 24. The crystal 25 in the unit 23 is plugged at one end into a hole 26 drilled in the conductor 4. Contact is made with the other end of the crystal by a leaf spring 27 fixed by a terminal screw 28. A direct-current meter 29 is fixed by means of a strip 30 in the centre of the casing 1, one terminal being connected to the casing and the other to the screw 28. A decoupling condenser shunting the meter is formed by the thin mica strip 31 by which the frame of the crystal unit 23 is insulated from the casing 1.

The crystal unit 24 is in principle similar to the crystal unit 23, but connection to the resonator is made by means of a loop linking the field of the resonator, and the housing arrangements are different. The crystal is connected in series with the meter, a filter condenser shunting the meter being provided by the insulating arrangements in the unit.

Where as in the case of the unit 23 a direct connection is made to the conductor 4, a high sensitivity coupling is obtained, but the resonator will have a relatively low Q value. In the other case the coupling is relatively loose and so the resonator will have a high Q value at the expense of sensitivity.

What is claimed is:

1. An electric wave-meter comprising a hollow, cup-shaped resonator portion, a circular cover adapted to fit over said resonator portion to complete said resonator, said cover being rotatably mounted, means attached to said cover and extending into said resonator to vary the volume of said resonator upon rotation of said cover, means for introducing waves into said resonator for measurement, and means for indicating the condition of resonance of said resonator.

2. An electric wave-meter as claimed in claim 1 wherein the means attached to said cover and extending into said resonator comprise a piston, said piston slidable in said resonator for adjusting the effective length of said resonator.

3. An electric wave meter comprising an open annular coaxial line resonator closed by a rotatable annular cover, a short-circuiting plug at one point in the said resonator, a short-circuiting piston slidable on the central conductor of the said resonator and movable by rotation of the said cover for adjusting the effective length of the resonator, means for introducing waves to be measured into the resonator, and means for indicating the condition of resonance of said resonator.

4. A double electric wave meter comprising an open annular coaxial line resonator closed by a rotatable annular cover, a short-circuiting plug at one point in the said resonator, a short-circuiting piston slidable on the central conductor of the said resonator and movable by the rotation of the said cover about the axis of said resonator to divide the resonator in two separate sections of adjustable length, means for introducing waves to be measured into the said sections, and means for indicating the condition of resonance of the said sections.

5. A wave meter according to claim 3 in which the resonator comprises an annular channel of rectangular section cut in an annular metal casting, a central conductor fixed symmetrically inside the said channel, and a flat annular cover forming the fourth wall of the said channel.

6. A wave meter according to claim 3 comprising means for engaging the piston with the underside of the cover in such manner that said piston is carried round the channel on rotation of said cover.

7. A wave meter according to claim 3 in which said piston is built up of a plurality of separate interlocking parts assembled around the central conductor.

8. A wave meter according to claim 3 comprising a co-axial transmission line assembled through the wall of said resonator, in close proximity to the said short circuiting plug, and terminating in a loop linking with the field of at least a section of said resonator.

9. A wave meter according to claim 3 in which the indicating means comprises a crystal detector coupled to the said resonator in close proximity to the said short-circuiting plug, and a direct current indicating instrument connected to the said crystal detector.

10. A wave meter according to claim 9 in which said indicating instrument is circular and is assembled in the centre of the said annular coaxial line resonator.

11. An arrangement according to claim 3 in which the outer surface of said cover is graduated with a scale indicating the quantities measured, a fixed portion attached to the said resonator and the said scale co-operating with an index marked on said fixed portion of the said resonator.

CHARLES NORMAN SMYTH.
ARCHIBALD STEPHENS WADE.

REFERENCES CITED

The following references are of record in the file of this patent:

UNITED STATES PATENTS

| Number | Name | Date |
|---|---|---|
| 1,768,251 | Heising | June 24, 1930 |
| 2,106,713 | Bowen | Feb. 1, 1938 |
| 2,121,855 | Bushbeck | June 28, 1938 |
| 2,226,653 | Allerding et al. | Dec. 31, 1940 |
| 2,245,138 | Zottu | June 10, 1941 |
| 2,326,519 | Burnside | Aug. 10, 1943 |
| 2,400,597 | Peterson | May 21, 1946 |
| 2,402,663 | Ohl | June 25, 1946 |